April 15, 1924.
I. O. GARDNER
BINDER WEDGE BOLT
Filed Oct. 20, 1923
1,490,697
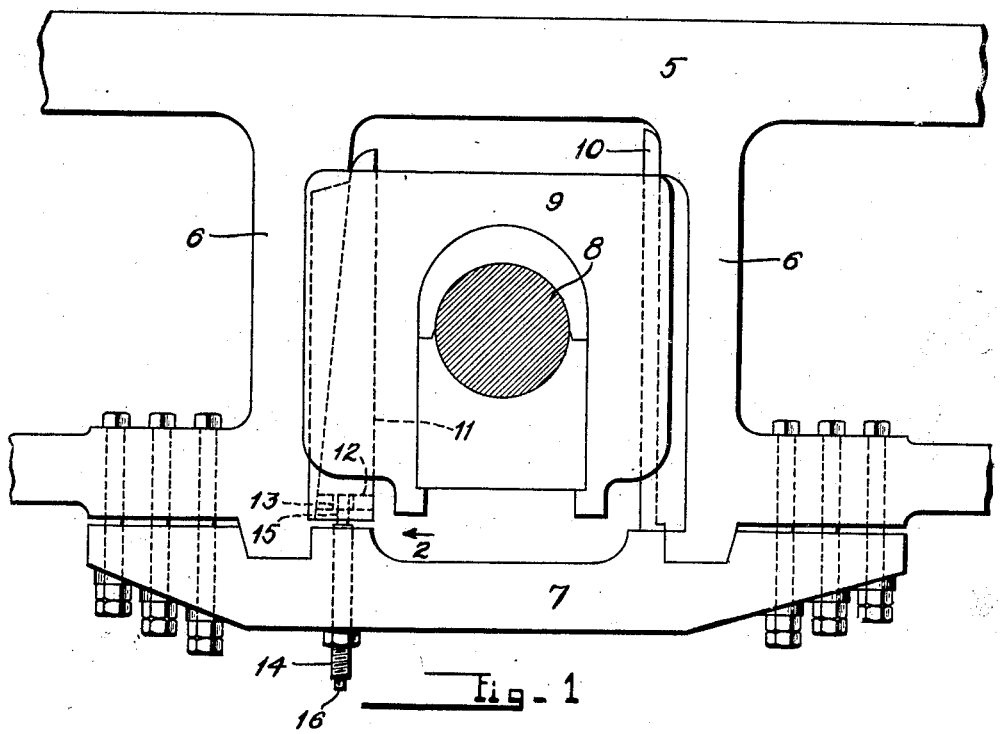
Fig. 1
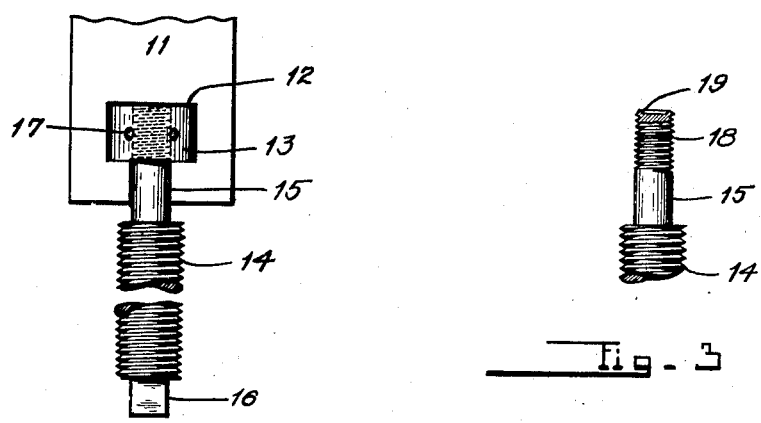
Fig. 2
Fig. 3
Inventor
Ivan O. Gardner
By John W. Darley
Attorney Patented Apr. 15, 1924.

1,490,697

UNITED STATES PATENT OFFICE.

IVAN O. GARDNER, OF SOMERSET, PENNSYLVANIA.

BINDER WEDGE BOLT.

Application filed October 20, 1923. Serial No. 669,746.

*To all whom it may concern:*

Be it known that I, IVAN O. GARDNER, a citizen of the United States, residing at Somerset, in the county of Somerset and State of Pennsylvania, have invented certain new and useful Improvements in Binder Wedge Bolts; and I do hereby declare the following to be a full, clear, and exact description of the invention, such as will enable others skilled in the art to which it appertains to make and use the same.

My invention relates to binder wedge bolts for use in taking up the slack between the bearings of the axles of locomotive driving wheels and the frame of the locomotive.

Among the objects of my invention are:—

To produce a wedge bolt which can be applied to locomotive pedestal wedges now in use without changing any of the features of said wedges, the pedestals or the pedestal wedges.

To produce a wedge bolt which can be applied to locomotive pedestal wedges or removed therefrom without removing the pedestal braces.

In carrying out my invention, I make use of the instrumentalities illustrated in the accompanying drawings, in which:—

Figure 1 is a side view of a portion of a locomotive frame showing a driving wheel axle, the pedestal and appurtenant parts thereof with my improved bolt applied thereto.

Fig. 2 is an enlarged detail view of my improved bolt and the lower portion of the wedge when viewed in the direction of the arrow 2 in Fig. 1.

Fig. 3 is an enlarged detail view of my improved bolt partly in section.

In the drawings:—

5 represents a frame of a locomotive provided with a pedestal composed of the sides 6—6 which are united at their bottoms by the pedestal brace 7.

The driving axle 8 is mounted within the bearing 9 and the latter slides within the sides 6—6 to one of which the wearing strip 10 is applied and to the other of which the wedge 11 is applied. The wedge 11 is provided with a T slot 12 at its lower end within which is slidably mounted the cylindrical nut 13, the latter being threaded upon the upper end of the bolt 14 which is provided with a cylindrical portion 15 that slides within the lower portion of the slot 12.

The bolt 14 is threaded in a hole provided in the brace 7 and has at its lower end the square portion 16 for the application of a wrench.

In applying my improved bolt to the wedge 11, the body of the bolt 14 is screwed within the brace 7 and the nut 13 is placed within the upper part of the groove 12, the wedge 11 being in the position shown in Fig. 1.

The bolt 14 is turned until the nut 13 is screwed against the shoulder formed by the portion 15.

Holes such as 17 may be provided for the application of a lever for the purpose of holding the nut 13.

The thread 18 at the top of the bolt 14 is made of a different or finer pitch than the thread upon the body of said bolt in order to prevent displacement of the nut 13 and, as an additional security, to hold said nut in place, the top of the bolt 14 is countersunk as at 19 to provide a feather edge, which is turned over when it strikes the top of the slot 12 after the nut 13 has been screwed in place.

I have shown one arrangement of my improved bolt and cooperating parts, but it is to be understood that the disclosure is for purposes of illustration only and in no wise to limit the scope of my invention, for changes may be made in the structure shown and described without departing from the spirit of my invention.

I claim:—

1. The combination with a pedestal comprising a pair of sides, a wedge engaging one of said sides and comprising a slot, and a bearing slidably mounted between said wedge and the other of said sides, of a bolt adjustably supported by said pedestal and a nut on said bolt mounted in said slot, said bolt having a countersunk end forming a feather edge extending above said nut to be turned by the surface of said slot to secure said nut to said bolt.

2. The combination with a pedestal comprising a pair of sides, a wedge engaging one of said sides and comprising a slot, and a bearing slidably mounted between said wedge and the other of said sides, of a brace secured to said pedestal, a bolt threaded in said brace and a nut threaded on said bolt and mounted in said slot, said nut having a thread of a different pitch from the thread in said brace.

3. The combination with a pedestal comprising a pair of sides, a wedge engaging one of said sides and comprising a slot, and a bearing slidably mounted between said wedge and the other of said sides, of a brace secured to said pedestal, a bolt threaded in said brace and a nut threaded on said bolt and mounted in said slot, said nut having a thread of a finer pitch than the thread in said brace.

In testimony whereof, I affix my signature.

IVAN O. GARDNER.